(12) United States Patent
Flowerday et al.

(10) Patent No.: US 10,726,065 B2
(45) Date of Patent: Jul. 28, 2020

(54) SYSTEMS AND METHODS FOR OFFLOADING ASSETS FROM A PORTABLE ELECTRONIC DEVICE TO LONG-TERM STORAGE

(71) Applicant: MOTOROLA SOLUTIONS, INC., Chicago, IL (US)

(72) Inventors: David B. Flowerday, North Barrington, IL (US); Remigiusz Orlowski, Dobczyce (PL); Steven D. Tine, Cheshire, CT (US); Krzysztof Rafal Sniezynski, Crakow (PL); Lechoslaw Radwanski, Oswiecim (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 3 days.

(21) Appl. No.: 16/099,423

(22) PCT Filed: May 20, 2016

(86) PCT No.: PCT/PL2016/050021
§ 371 (c)(1),
(2) Date: Nov. 6, 2018

(87) PCT Pub. No.: WO2017/200402
PCT Pub. Date: Nov. 23, 2017

(65) Prior Publication Data
US 2019/0155833 A1     May 23, 2019

(51) Int. Cl.
*G06F 16/487*     (2019.01)
*G06F 21/64*     (2013.01)
(Continued)

(52) U.S. Cl.
CPC ............ *G06F 16/487* (2019.01); *G06F 1/163* (2013.01); *G06F 21/00* (2013.01); *G06F 21/64* (2013.01);
(Continued)

(58) Field of Classification Search
CPC ........ G06F 16/487; G06F 21/00; G06F 1/163; G06F 21/64; G06F 16/113; H04L 67/1095; H04L 63/30
(Continued)

(56) References Cited

U.S. PATENT DOCUMENTS

2006/0083207 A1*   4/2006   Karimi ............... G06F 11/1464
370/338
2016/0044531 A1*   2/2016   Papa ................. H04W 28/0247
370/230

FOREIGN PATENT DOCUMENTS

WO    2015/131936    9/2015
WO    2016/033523    3/2016

OTHER PUBLICATIONS

PCT/PL2016/050021 International Search Report and Written Opinion of the International Searching Authority dated Jan. 18, 2017 (10 pages).
(Continued)

*Primary Examiner* — Tu T Nguyen
(74) *Attorney, Agent, or Firm* — Michael Best & Friedrich LLP (57) ABSTRACT

A method and system for offloading assets from a portable electronic device to a long-term storage location. One exemplary embodiment provides a system, which includes an asset management controller, including an electronic processor. The electronic processor is configured to receive, from the portable electronic device, an asset upload request, which request includes at least one device status indicator
(Continued)

and an asset manifest, which manifest includes at least two asset identifiers and associated metadata. The electronic processor is configured to determine, based on the asset manifest and the at least one device status indicator, whether to grant or deny each of the asset identifiers, and to determine at least one storage message based on the asset upload request, which message includes one of a grant and deny for each of the asset identifiers. The electronic processor is configured to transmit, to the portable electronic device, the at least one storage message.

16 Claims, 5 Drawing Sheets

(51) Int. Cl.
*G06F 21/00* (2013.01)
*G06F 1/16* (2006.01)
*H04L 29/06* (2006.01)
*H04L 29/08* (2006.01)

(52) U.S. Cl.
CPC .......... *H04L 63/30* (2013.01); *H04L 67/1095* (2013.01)

(58) Field of Classification Search
USPC ........................................................ 709/219
See application file for complete search history.

(56) References Cited

OTHER PUBLICATIONS

Canadian Requisition by Examiner in Accordance with Subsection 30(2) and Section 29 of the CIPO Patent Rules dated Sep. 24, 2019 for corresponding Canadian Application No. 3,023,499.
Australian Examination Report No. 1 dated May 31, 2019 for corresponding Australian Application 2016407391 (3 pages).

* cited by examiner

SYSTEMS AND METHODS FOR OFFLOADING ASSETS FROM A PORTABLE ELECTRONIC DEVICE TO LONG-TERM STORAGE

BACKGROUND OF THE INVENTION

Portable electronic devices (for example, body-worn cameras) are used by law enforcement and other personnel to capture multimedia assets (for example, video recordings, audio recordings, digital photographs, and the like). Metadata relating to the multimedia assets may also be created and stored on the portable electronic devices. Some multimedia assets, and their associated metadata, may need to be preserved (for example, to comply with public records laws). Some multimedia assets and metadata may be used as evidence in criminal trials or other official investigations or proceedings. When used in such proceedings, demonstrating the authenticity of multimedia assets may be mandated by applicable law.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a system for offloading assets from a portable electronic device. The system includes an asset management controller, which includes a network interface and an electronic processor coupled to the network interface. The electronic processor is configured to receive, from the portable electronic device via the network interface, an asset upload request. The asset upload request includes at least one device status indicator and an asset manifest. The asset manifest includes at least two asset identifiers and metadata associated with each of the at least two asset identifiers. The electronic processor is further configured to determine, based on the asset manifest and the at least one device status indicator, whether to grant or deny each of the at least two asset identifiers in the asset upload request. The electronic processor is further configured to determine at least one storage message based on the asset upload request. The at least one storage message includes one of a grant and deny for each of the at least two asset identifiers. The electronic processor is further configured to transmit, to the portable electronic device via the network interface, the at least one storage message.

Another exemplary embodiment provides a method for offloading assets from a portable electronic device. The method includes receiving, by an electronic processor, via a network interface coupled to the electronic processor, from the portable electronic device, an asset upload request. The asset upload request includes at least one device status indicator and an asset manifest. The asset manifest includes at least two asset identifiers and metadata associated with each of the at least two asset identifiers. The method further includes determining, by the electronic processor, based on the asset manifest and the at least one device status indicator, whether to grant or deny each of the at least two asset identifiers in the asset upload request. The method further includes determining, by the electronic processor, at least one storage message based on the asset upload request. The at least one storage message includes one of a grant and deny for each of the at least two asset identifiers. The method further includes transmitting, by the electronic processor via the network interface, the at least one storage message to the portable electronic device.

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
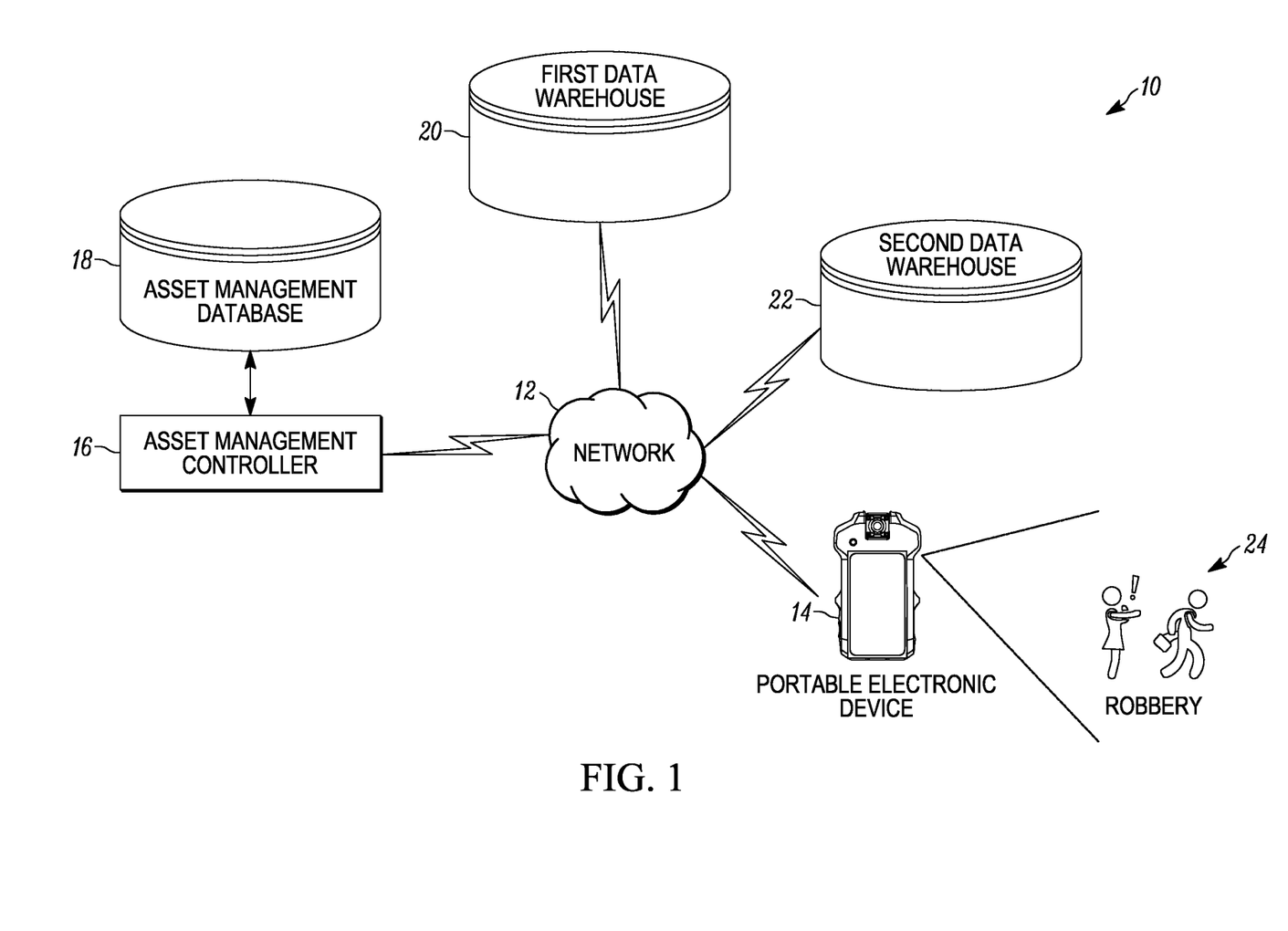
FIG. 1 is a diagram of an asset management system in accordance with some embodiments.

FIG. 1 is a diagram of one exemplary embodiment of an asset management system 10. The terms "asset," "asset file," and "multimedia asset," as used herein, refer to multimedia files (for example, video recordings, audio recordings, digital photographs, and the like) captured and stored by operation of the asset management system 10. The asset management system 10 includes a network 12, a portable electronic device 14, an asset management controller 16, an asset management database 18, a first data warehouse 20, and a second data warehouse 22. The exemplary asset management system 10 illustrated in FIG. 1 is a public safety asset management system-though other embodiments of the asset management system 10 are not limited to public safety applications.

In one example, the portable electronic device 14 may be used by a law enforcement agency to capture and store a multimedia asset (for example, a video) of a robbery 24. The portable electronic device 14 may also receive and store metadata relating to the asset. As described in greater detail below, embodiments of the asset management system 10 are configured to offload the captured asset and its associated metadata from the portable electronic device 14, and place the asset in long-term storage (for example, the first data warehouse 20 or the second data warehouse 22). The asset may then be used as evidence in criminal justice proceedings related to the robbery 24, or in other ways.

The network 12 may a wired or wireless network. All or parts of the network 12 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 12 may also include future developed networks. The portable electronic device 14, the asset management controller 16, the asset management database 18, the first data warehouse 20, and the second data warehouse 22 communicate with each other over the network 12 using suitable wireless or wired communications protocols. In some embodiments, communications with other external devices (not shown) occurs over the network 12.

In the example illustrated, the portable electronic device 14 is a body-worn camera, for example, one of the Motorola® Si series of video speaker microphones. The portable electronic device 14 includes components (for example, a digital camera, a microphone, a microprocessor, memory, and a network interface) for capturing, storing, and transmitting multimedia assets (for example, over the network 12). Embodiments of the portable electronic device 14 also include hardware and software (for example, buttons, a touchscreen, and a user interface) for receiving user inputs and other data. Other components (not shown) may be included to provide different functions (for example, radio communications). In alternative embodiments, the portable electronic device 14 may be a handheld communication device (for example, a mobile telephone, portable two-way radio, or other portable communication device), a smart watch or other smart wearable, or other electronic device capable of capturing assets and communicating over the network 12.

The asset management controller 16, described in greater detail below, communicates with, and controls the portable electronic device 14 to offload and store assets (for example, in the first data warehouse 20 and the second data warehouse 22). The asset management controller 16 is communicatively coupled to the asset management database 18, which electronically stores information regarding the offloaded assets in a relational database. The asset management controller 16 is reads and writes such information to and from the asset management database 18, which database may be housed on a suitable database server (not shown); integrated with, or internal to, the asset management controller 16; or external to the asset management system 10 and accessible over the network 12.

The first data warehouse 20 is a central repository for storing data electronically. The first data warehouse 20 is capable of communicating and exchanging data with the portable electronic device 14 and the asset management controller 16 over the network 12. In some embodiments, the first data warehouse 20 is a commercial cloud-based storage service such as, for example, the Amazon™ Simple Storage Service (Amazon S3). In some embodiments, the first data warehouse 20 is a data storage system provided internally by the agency that owns and operates the asset management system 10. The first data warehouse 20 may be compliant with the Federal Bureau of Investigation's Criminal Justice Information Services (CJIS) standard. The second data warehouse 22 is similar to the first data warehouse 20 and, collectively, the two examples illustrated are representative of any number of data warehouses, which are capable of communicating and exchanging data with the portable electronic device 14 and the asset management controller 16 over the network 12. In some embodiments, the asset management system 10 uses a single data warehouse to store offloaded assets; in other embodiments two, three, or more data warehouses may be selected from and used to store offloaded assets.

Figure 2:
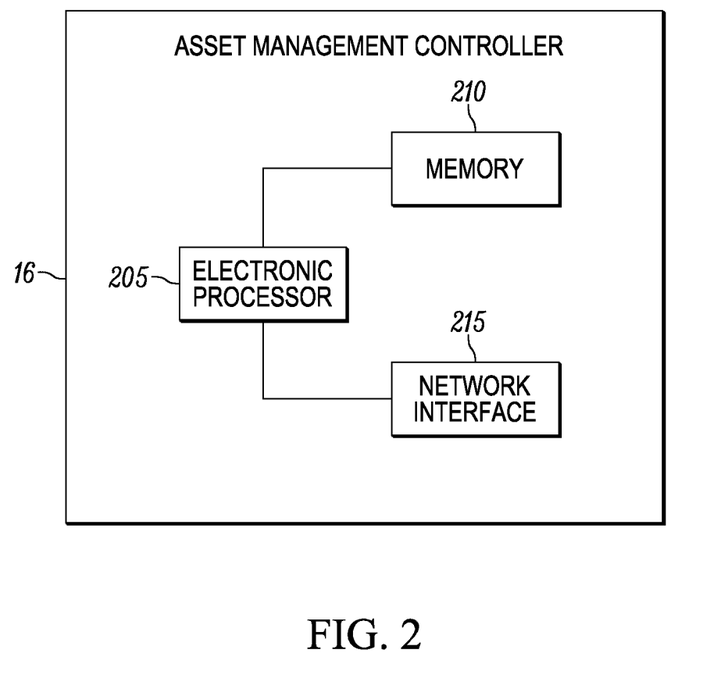
FIG. 2 is a diagram of an asset management controller in accordance with some embodiments.

FIG. 2 is a diagram of one exemplary embodiment of the asset management controller 16. In the embodiment illustrated, the asset management controller 16 includes an electronic processor 205 (for example, a microprocessor, or other electronic controller), a memory 210, and a network interface 215. The electronic processor 205, the memory 210, and the network interface 215, as well as the other various modules are coupled directly, by one or more control or data buses, or a combination thereof.

The memory 210 may include read-only memory (ROM), random access memory (RAM), other non-transitory computer-readable media, or a combination thereof. The electronic processor 205 is configured to retrieve instructions and data from the memory 210 and execute, among other things, instructions to perform the methods described herein.

The electronic processor 205 controls the network interface 215 to send and receive data over the network 12. For example, the network interface 215 may include a transceiver for wirelessly coupling to the network 12. Alternatively, or in addition, the network interface 215 may include a connector or port for receiving a wired connection (for example, Ethernet) to the network 12.

As noted above, embodiments of the portable electronic device 14 may be body-worn cameras, used by law enforcement personnel to make audio, video, or still picture recordings of incidents (for example, traffic stops, crimes in progress, accident investigations, interactions with members of the public, and the like). The portable electronic device 14 does not have a limited memory capacity, and must therefore occasionally offload the asset files created by recording these incidents to make room for new asset files to be created. An asset may be of an urgent nature (for example, video of an at-large crime suspect) such that it is desirable to provide speedy access to other members of the public safety agency or other agencies. Some assets may need to be preserved (for example, to comply with public records laws). Therefore, there exists a need to offload the multimedia assets from the portable electronic device by uploading the multimedia assets to an asset management system to facilitate long term storage and retrieval.

Figure 3:
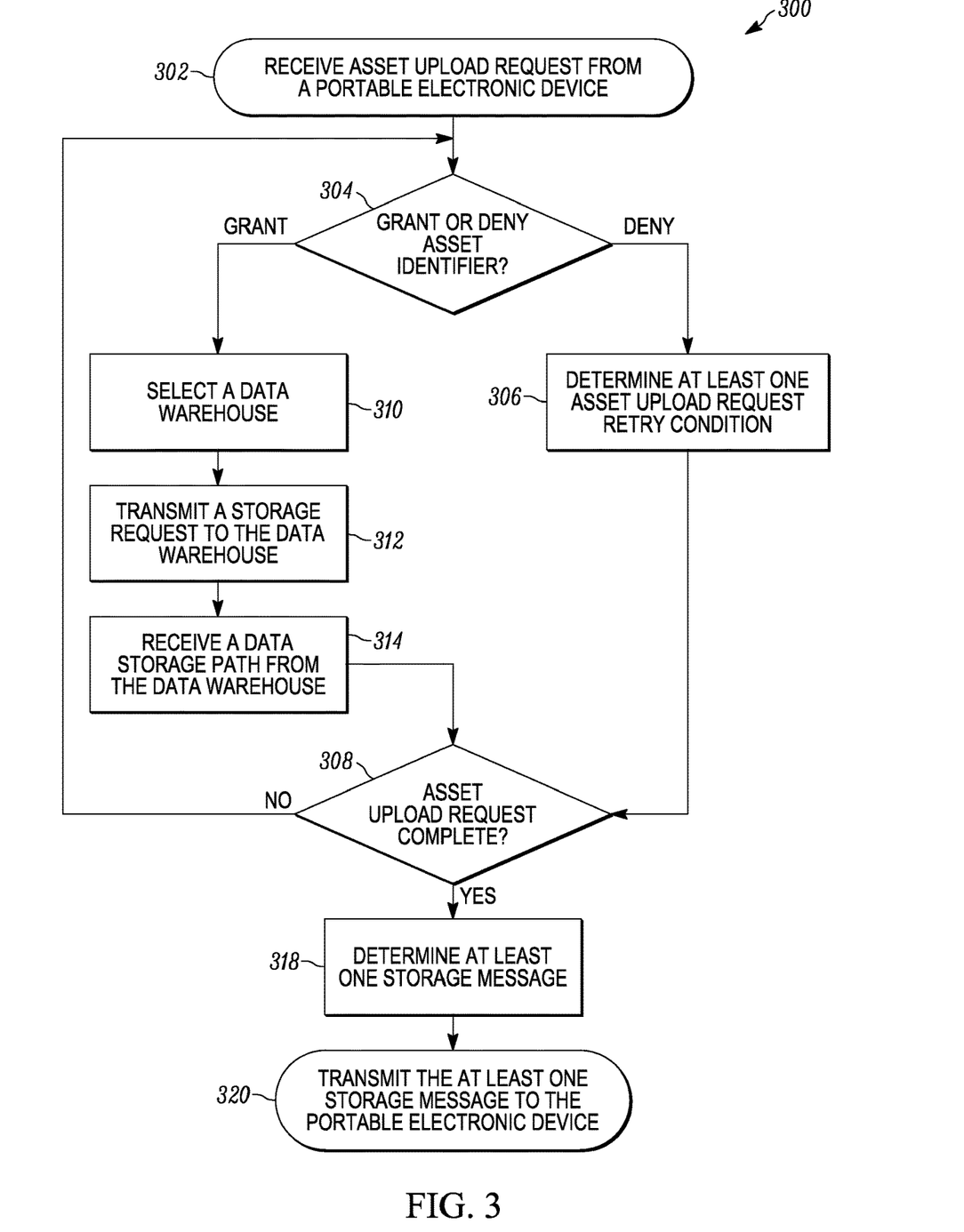
FIG. 3 is a flowchart of a method for offloading assets from a portable electronic device, in accordance with some embodiments.

Accordingly, FIG. 3 illustrates an exemplary method 300 for offloading assets from the portable electronic device 14 for long-term storage. At block 302, the electronic processor 205 receives, via the network interface 215 at least one asset upload request from the portable electronic device 14 over the network 12. An asset upload request is a request from the portable electronic device 14 to offload one or more assets stored locally on the portable electronic device 14. Each asset upload request includes an asset manifest and at least one device status indicator.

An asset manifest includes at least one asset identifier and metadata associated with each of the asset identifiers. In some embodiments, the asset manifest includes at least two asset identifiers. Each asset identifier identifies an asset to be offloaded by the portable electronic device 14. Metadata is data pertaining to an asset, linked to the asset by the asset identifier. Metadata may include a file type (for example, video, audio, or photo), a file size, a timestamp (that is, when the asset was captured), a user role for the user who captured the asset (for example, police officer or supervisor), an incident type (for example, a crime, a traffic stop, and the like), or an incident identifier (for example, from a computer-aided dispatch system). Metadata may also be an asset capture location, such as, for example, the geographic coordinates or an address where the asset was captured, or an indication that the asset was captured within a geographic area (for example, a geofence) that is predefined to be of high interest (for example, a high-crime area or an area surrounding an emergency situation).

Each device status indicator indicates something about the status of the portable electronic device 14 at the time the asset upload request is made. Device status indicators may include a connected network identifier (that is, which network the device is currently communicating over), nearby network identifiers (for example, nearby Wi-Fi networks to which the portable electronic device 14 may connect), a connected network signal strength (for example, a Wi-Fi signal strength level), a battery level (for example, what percentage of the battery is remaining), a charging status (for example, receiving a charge), a device location, and a memory usage level (that is, how much storage is still available for capturing and storing assets on the portable electronic device 14).

For each of the asset identifiers in the asset manifest, the electronic processor 205 determines whether to grant or deny the asset upload request. At block 304, the electronic processor 205 determines whether to grant or deny the asset upload request based on the metadata from the asset manifest and at least one of the device status indicators. For example, when an asset is associated with a high-priority incident, the electronic processor 205 may grant the request. In another example, the connected network identifier may indicate that the portable electronic device 14 is connected to a network which is not suitable for large data transmissions, and the electronic processor 205 may deny the asset upload request. In another example, the battery level may be too low to power the portable electronic device 14 for the duration of the asset upload, and the electronic processor 205 may deny the asset upload request. In another example, the connected network signal strength may be below an acceptable threshold, and the electronic processor 205 may deny the asset upload request. In another example, the charging status may indicate that the device is plugged into a power source, and the electronic processor 205 may grant the request. In another example, the device location may indicate that the device is in an "upload zone" where an upload is more likely to successfully complete (for example, a police administration building), and the electronic processor 205 may grant the request. In another example, the device location may indicate that the device is in a "do not upload zone" where an upload is more likely to start, but then fail (for example, near the edge of a network's coverage area), and the electronic processor 205 may deny the request. In another example, the memory usage level may indicate that the device must offload its asset(s) soon, and the electronic processor 205 may grant the request.

When the electronic processor 205 determines to deny the asset identifier, it determines at least one asset upload request retry condition, at block 306.

For example, if a battery level is too low (for example, 10%), the electronic processor may determine an acceptable battery level (for example, 50%), at which the portable electronic device 14 should retry its asset upload request. In another example, when the network signal strength is below an acceptable level, the electronic processor may determine acceptable signal strength, at which the portable electronic device 14 should retry its asset upload request. In another example, when the connected network indicator indicates that the portable electronic device is connected to an unsuitable network, and a nearby network indicator indicates that a more suitable network is available, the electronic processor may determine that the portable electronic device 14 should retry its asset upload request when it is connected to the more suitable network. In some embodiments, the electronic processor 205 determines more than one asset upload request retry condition, any one, or some combination of, which must be met before the portable electronic device 14 should retry its asset upload request.

At block 308, the electronic processor 205 determines whether the asset upload request is complete (that is, whether all asset identifiers have been assigned a grant or a deny). When asset identifiers remain, the electronic processor 205 returns to block 304 and determines whether to grant or deny the next asset identifier in the asset manifest.

When the electronic processor 205 determines to grant the asset identifier at block 304, it selects a data warehouse for long-term storage of the asset, at block 310. The data warehouse is selected from available data warehouses (for example, the first data warehouse 20 and the second data warehouse 22) based on the asset identifier and the metadata. For example, the file type of the asset may be more suitable to the first data warehouse 20 than the second data warehouse 22. In another example, the first data warehouse 20 may be compliant with the Criminal Justice Information Services standard, while the second data warehouse 22 may not be. In such case, assets related to certain incident types (for example, criminal investigations) may have to be stored on the first data warehouse 20. In another example, assets of a particular type, or relating to particular incidents types, may be stored on a local data warehouse, rather than a cloud-based data warehouse, or vice-versa. In some embodiments, the device status may be used to select the data warehouse. For example, when the connected network is a private network, a privately-hosted data warehouse may be selected. In another example, when the connected network is a public network, a public data warehouse may be selected. In some embodiments, the cost of a data warehouse is used to select the data warehouse. For example, assets that are low priority, and thus may not be frequently accessed, are suitable for a lower cost "cold storage" data warehouse (for example, the Amazon Glacier™ service).

At block 312, the electronic processor 205 transmits, via the network interface 215, a storage request to the data warehouse selected at block 310. At block 312, the electronic processor 205 receives, via the network interface 215, a data storage path from the data warehouse. The data storage path is an electronic identifier used to identify where the data should be stored in the data warehouse.

At block 308, the electronic processor 205 determines whether the asset upload request is complete. As noted above, when asset identifiers remain, the electronic processor 205 returns to block 304. When the electronic processor 205 determines that the asset upload request is complete (that is, all asset identifiers have been assigned a grant or a deny), the electronic processor 205 determines at least one storage message, at block 316. In some embodiments, one storage message is determined for each of the asset identifiers. In other embodiments, a single storage message includes the determinations for each of the asset identifiers. For each asset identifier granted, the storage message identifies the data warehouse and includes the data storage path, which the portable electronic device 14 may use to offload the asset (that is, upload the asset to the data warehouse selected at block 310). For each asset identifier denied, the storage message includes the at least one asset upload request retry condition determined at block 306. Accordingly, a storage message may include grants for all asset identifiers in the asset manifest, denials for all asset identifiers in the asset manifest, or a combination of grants and denials.

In some embodiments, the electronic processor 205 further determines the storage message based on at least one storage priority (one for each asset) and at least one storage time (one for each asset), each based on the metadata and the asset identifier. For example, it may be desirable to have all assets related to a high-priority incident (for example, an officer-involved shooting) offloaded as soon as possible. All assets, whose metadata includes the incident identifier for the high-priority incident, may be assigned a higher priority for offload than other assets. In such case, the storage message would include a storage priority indicated that the asset identified by the asset identifier be offloaded before other assets. Similarly, the storage time may be determined based on the metadata for the asset. For example, video assets are larger files than audio assets, and it may be advantageous to offload the video assets during off-peak times when the network 12 is less busy. In one example, the asset upload request received at block 302 may be a request to upload a large video asset of an unimportant event. Such an asset may be allocated a lower priority and assigned an upload time of three A.M.

In some embodiments, the electronic processor 205 further determines whether the storage message should include data chunking. Data chunking is used to separate (or "chunk") larger data (for example, a large video file) into discrete similarly-sized parts to make transmission and storage more efficient. When the electronic processor 205 determines data chunking should be used for an asset, the storage request transmitted (at block 312) to the data warehouse includes a chunking request. Similarly, the data storage path received at block 314 is responsive to the data chunking request, and may include more than one storage location, or may indicated a location within the data warehouse particular to chunking. In some embodiments, the data warehouse selected at block 310 is selected based on its ability to accept data chunking requests.

At block 320, the electronic processor 205 transmits, via the network interface 215, the at least one storage message to the portable electronic device 14. The asset identifiers, the associated metadata, and the storage message are stored by the electronic processor 205 in the asset management database 18. Accordingly, the asset management controller 16 may track the locations of the assets in the data warehouses. Users of the asset management controller 16 may search the metadata to identify assets of interest, and, in turn, retrieve those assets based on the information in the storage message.

Assets, especially those captured by public safety agencies, may be used for evidence in criminal trials or other official investigations or proceedings, in which the authenticity of the asset is mandated by applicable law. Accordingly, FIG. 4 illustrates an exemplary method 400 for maintaining a chain of custody for assets offloaded from the portable electronic device 14.

Figure 4:
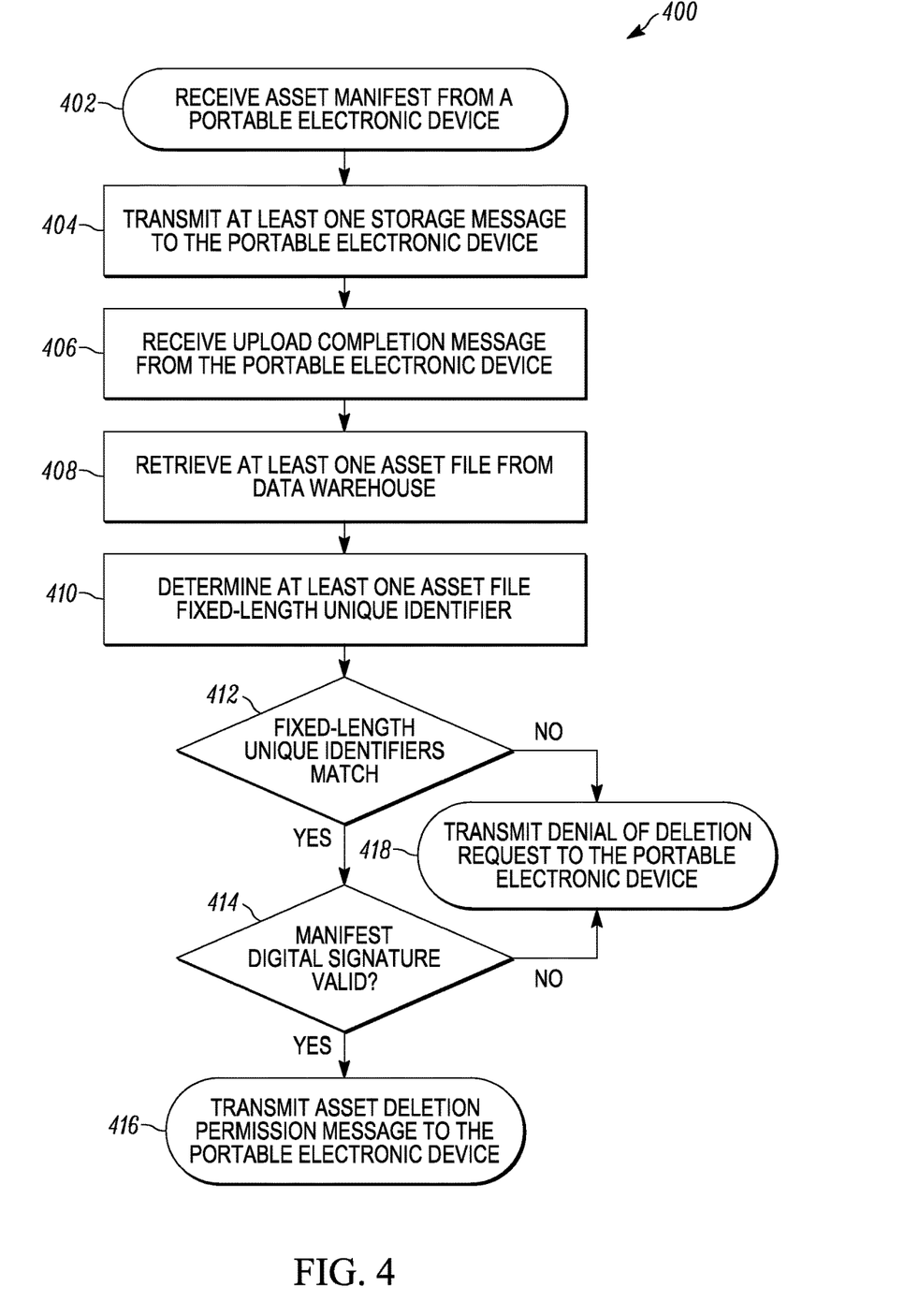
FIG. 4 is a flowchart of a method of maintaining chain of custody for assets offloaded from the portable electronic device, in accordance with some embodiments.

Turning to FIG. 4, at block 402, the electronic processor 205 receives an asset manifest from the portable electronic device 14. This asset manifest is part of an asset upload request, as described above in relation to FIG. 3. Included in the asset manifest, is at least one fixed-length unique identifier (for example, a SHA-256 hash of the asset file). In some embodiments, one fixed-length unique identifier is received for each asset identified in the manifest. The asset manifest further includes an asset manifest digital signature. The asset manifest digital signature is generated by the portable electronic device 14 by signing the manifest with a private key known only to the portable electronic device 14 (for example, using a public-private key encryption algorithm).

At block 404, the electronic processor 205 transmits, via the network interface 215, at least one storage message to the portable electronic device 14. The storage message is determined based on the asset manifest using the method 300, described above. At block 406, the electronic processor 205, via the network interface 215, receives an upload completion message from the portable electronic device 14, which message indicates that the assets identifiers granted in the storage message have been offloaded (uploaded to the data warehouse(s)). As noted above, the portable electronic device 14 has a limited asset storage capacity. Accordingly, the upload completion message may include a request to delete the assets stored in a local memory of the portable electronic device 14, if those assets have been successfully offloaded (that is, uploaded to a data warehouse using the method 300).

At block 408, the electronic processor 205 retrieves at least one of the asset files identified in the storage message transmitted at block 404 from the data warehouse identified in the storage message. The electronic processor 205 may temporarily store the retrieved asset file in the memory 210 or the asset management database 18.

At block 410, the electronic processor 205 determines at least one asset file fixed-length unique identifier (that is, one for each asset file retrieved at block 408). The asset file fixed-length unique identifier is determined similarly to the fixed-length unique identifier received at block 402. For example, when the fixed-length unique identifier is a SHA-256 hash of the asset file on the portable electronic device 14, then the asset file fixed-length unique identifier is also a SHA-256 hash of the retrieved asset file. When the SHA-256 hash of the asset file created on the portable electronic device 14 matches the SHA-256 hash of the retrieved asset file, the files are identical. Accordingly, at block 412, the electronic processor 205 determines whether the asset file fixed-length unique identifier determined at block 410 matches the fixed-length unique identifier received at block 402.

When the identifiers match, the electronic processor 205 determines whether the manifest digital signature is valid, at block 414. The electronic processor 205 determines whether the manifest signature is valid using a public key known to both the portable electronic device 14 and the asset management controller 16 using a public key cryptography system (for example, RSA). In some embodiments, the electronic processor 205 may receive from the portable electronic device 14, via the network interface 215, a digital certificate (for example, generated by a certificate authority), which includes the public key. In such embodiments, the electronic processor 205 may validate the digital certificate with the certificate authority prior to using the public key to validate the manifest digital signature. When the manifest signature is valid, the electronic processor 205 transmits, via the network interface 215, an asset deletion permission message to the portable electronic device 14. The asset deletion permission message indicates to the portable electronic device 14 that the asset file was successfully offloaded, and that the portable electronic device 14 may delete its local copy of the asset file.

When the fixed-length unique identifiers do not match (at block 412) or the manifest digital signature is not valid (at block 414), this may indicated that the asset file was not successfully offloaded, or may have been altered or corrupted. In such case, the electronic processor 205 transmits, via the network interface 215, a denial of the deletion request to the portable electronic device 14. The denial may include a request that the portable electronic device 14 retry the offload process.

Figure 5:
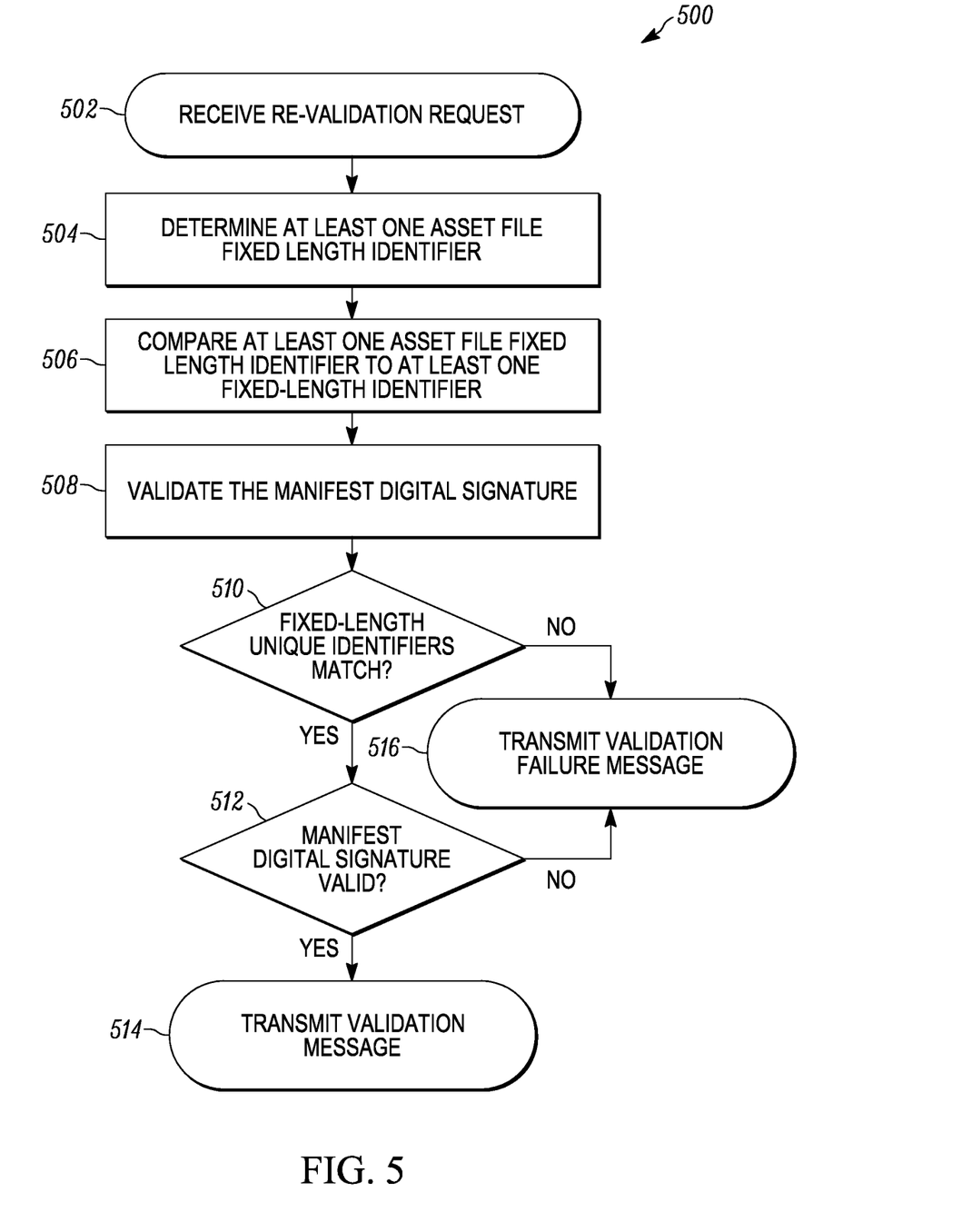
FIG. 5 is a flowchart of sub-method of maintaining chain of custody for assets offloaded from the portable electronic device, in accordance with some embodiments.

It may be desirable to re-validate an offloaded asset at a later date. For example, a prosecuting attorney preparing for trial may wish to authenticate an asset to be used for evidence at the trial. In another example, an officer may want to double check that a critical asset file was offloaded successfully before deleting the locally-stored asset file. Accordingly, FIG. 5 illustrates an exemplary sub-method 500 of maintaining chain of custody for assets offloaded from the portable electronic device.

At block 502, the electronic processor 205, receives, via the network interface 215, a re-validation request. The re-validation request may be received from the portable electronic device 14, or it may be received from another system (for example, a computer at a law enforcement agency or district attorney's office). The re-validation request includes at least one asset identifier (one for each asset file being re-validated), a fixed-length unique identifier for each asset file, and the manifest digital signature originally used when offloading the asset file.

In response to receiving the re-validation request, the electronic processor 205 determines, as described above in relation to the method 400, at least one asset file fixed-length unique identifier (one for each asset file being re-validated), at block 504. If the asset file is not stored locally in asset management controller 16 or the asset management database 18, the electronic processor 205 retrieves the asset file from the data warehouse before determining the at least one asset file fixed-length unique identifier.

At block 506, the electronic processor 205 compares the asset file fixed-length unique identifier determined at block 504 with the fixed-length unique identifier received at block 502. At block 508, the electronic processor 205 validates the manifest digital signature, as described above in relation to the method 400. At block 514, when the fixed-length identifiers match (at block 510) and the manifest digital signature block is valid (at block 512), the electronic processor 205 transmits, via the network interface 215, a validation message. The validation message indicates, to the device that requested the re-validation, that the asset file retrieved from the data warehouse is identical to the asset file originally captured by the portable electronic device 14.

At block 516, when the fixed-length identifiers do not match (at block 510) or the manifest digital signature block is not valid (at block 512), the electronic processor 205 transmits, via the network interface 215, a validation failure message. The validation failure message indicates, to the device that requested the re-validation, that the asset file retrieved from the data warehouse does not match the asset file originally captured by the portable electronic device 14.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for offloading assets from a portable electronic device, the system comprising:
   an asset management controller including
      a network interface; and
      an electronic processor coupled to the network interface and configured to
         receive, from the portable electronic device via the network interface, an asset upload request including at least one device status indicator and an asset manifest, the asset manifest including at least two asset identifiers and metadata associated with each of the at least two asset identifiers;
         determine, based on the asset manifest and the at least one device status indicator, whether to grant or deny each of the at least two asset identifiers in the asset upload request;
         determine at least one storage message based on the asset upload request, the at least one storage message including one of a grant and deny for each of the at least two asset identifiers;
         transmit, to the portable electronic device via the network interface, the at least one storage message; and
         for each of the at least two asset identifiers that is granted,
            determine at least one storage priority based on the metadata;
            determine at least one storage time based on the at least one asset identifier and the metadata; and
            determine the at least one storage message based further on the at least one storage priority and the at least one storage time.

2. The system of claim 1, wherein the electronic processor is further configured to
   determine, for each of the at least two asset identifiers that is denied, at least one asset upload request retry condition based on the metadata and at least one device status indicator; and
   determine at least one storage message based further on the at least one asset upload request retry condition.

3. The system of claim 1, wherein the electronic processor is further configured to for each of the at least two asset identifiers that is granted
   select a data warehouse based on the metadata;
   transmit, to the data warehouse via the network interface, a storage request;
   receive, from the data warehouse via the network interface, a data storage path in response to the storage request; and
   determine the at least one storage message based on the data warehouse and the data storage path.

4. The system of claim 1, wherein the electronic processor is further configured to for each of the at least two asset identifiers that is granted
   determine whether the storage message should include data chunking based on the at least one asset identifier and the metadata; and
   when the at least one storage message should include data chunking;
   select a data warehouse based on the metadata;
   transmit, to the data warehouse via the network interface, the storage request including a data chunking request; and
   receive, from the data warehouse via the network interface, a data storage path in response to the storage request and the data chunking request; and
   determine the at least one storage message based on the data warehouse, the data storage path, and the data chunking request.

5. The system of claim 1, wherein the metadata includes at least one selected from the group consisting of a file type, a file size, a timestamp, a user role, an incident type, an incident identifier, and an asset capture location.

6. The system of claim 1, wherein the at least one device status indicator is at least one selected from the group consisting of a connected network identifier, nearby network identifiers, a connected network signal strength, a battery level, a charging status, a device location, and a memory usage level.

7. The system of claim 1, wherein the at least one storage message includes at least one deny and at least one grant.

8. The system of claim 1, wherein the portable electronic device is a body-worn camera.

9. A method for offloading assets from a portable electronic device, the method comprising:
   receiving, by an electronic processor, via a network interface coupled to the electronic processor, from the portable electronic device, an asset upload request including at least one device status indicator and an asset manifest, the asset manifest including at least two asset identifiers and metadata associated with each of the at least two asset identifiers;
   determining, by the electronic processor, based on the asset manifest and the at least one device status indicator, whether to grant or deny each of the at least two asset identifiers in the asset upload request;
   determining, by the electronic processor, at least one storage message based on the asset upload request, the at least one storage message including one of a grant and deny for each of the at least two asset identifiers;
   transmitting, by the electronic processor via the network interface, the at least one storage message to the portable electronic device; and
   for each of the at least two asset identifiers that is granted,
      determining at least one storage priority based on the metadata;
      determining at least one storage time based on the metadata; and
      determining the at least one storage message based further on the at least one storage priority and the at least one storage time.

10. The method of claim 9, further comprising:
determining, by the electronic processor, for each of the at least two asset identifiers that is denied, at least one asset upload request retry condition based on the metadata and the at least one device status indicator; and
wherein determining the at least one storage message includes determining the at least one storage message based on the at least one asset upload request retry condition.

11. The method of claim 10, wherein the metadata includes at least one selected from the group consisting of a file type, a file size, a timestamp, a user role, an incident type, an incident identifier, and an asset capture location.

12. The method of claim 9, further comprising:
for each of the at least two asset identifiers that is granted
selecting, by the electronic processor, a data warehouse based on the metadata;
transmitting, by the electronic processor via the network interface, a storage request to the data warehouse;
receiving, by the electronic processor via the network interface, from the data warehouse, a data storage path in response to the storage request; and
determining, by the electronic processor, the at least one storage message based on the data warehouse and the data storage path.

13. The method of claim 9, further comprising: for each of the at least two asset identifiers that is granted
determining, by the electronic processor, whether the at least one storage message should include data chunking based on the metadata; and
when the at least one storage message should include data chunking;
selecting, by the electronic processor, a data warehouse based on the metadata;
transmitting, by the electronic processor via the network interface, the storage request, including a data chunking request, to the data warehouse; and
receiving, by the electronic processor via the network interface, from the data warehouse, a data storage path in response to the storage request and the data chunking request; and
determining, by the electronic processor, the at least one storage message based on the data warehouse, the data storage path, and the data chunking request.

14. The method of claim 9, wherein the at least one device status indicator is at least one selected from the group consisting of a connected network identifier, nearby network identifiers, a connected network signal strength, a battery level, a charging status, a device location, and a memory usage level.

15. The method of claim 9, wherein the at least one storage message includes at least one deny and at least one grant.

16. The method of claim 9, wherein the portable electronic device is a body-worn camera.

* * * * *